United States Patent
Kim

[11] Patent Number: 6,116,560
[45] Date of Patent: Sep. 12, 2000

[54] MONITOR STAND WITH SMOOTH TILTING AND ROTATING MOVEMENTS

[75] Inventor: Tae-Yon Kim, Seoul, Rep. of Korea

[73] Assignee: SamSung Electronics Co., Ltd., Suwon, Japan

[21] Appl. No.: 09/005,147

[22] Filed: Jan. 9, 1998

[30]     Foreign Application Priority Data

Jan. 10, 1997 [KR]  Rep. of Korea ............................ 97-408

[51] Int. Cl.[7] ................................................. A47G 29/00
[52] U.S. Cl. ................. 248/371; 248/346.01; 248/349.1; 248/923; 361/683
[58] Field of Search .............................. 248/371, 346.01, 248/346.03, 346.06, 349.1, 398, 919, 921, 922, 923; 361/683, 808

[56]               References Cited

U.S. PATENT DOCUMENTS

| 4,365,779 | 12/1982 | Bates et al. ............................ 248/371 |
| 4,483,503 | 11/1984 | Gahan ...................................... 248/349 |
| 4,589,713 | 5/1986 | Pfuhl et al. ................................. 339/7 |
| 4,645,153 | 2/1987 | Granzow .................................. 248/178 |
| 4,880,991 | 11/1989 | Lake, Jr. ................................. 248/371 |
| 5,398,903 | 3/1995 | Cho ........................................ 248/349 |
| 5,588,625 | 12/1996 | Beak ....................................... 248/371 |
| 5,603,480 | 2/1997 | Chen ....................................... 248/918 |
| 5,632,463 | 5/1997 | Sung et al. .............................. 248/371 |
| 5,683,068 | 11/1997 | Chase et al. ............................ 248/371 |
| 5,725,194 | 3/1998 | Glynn ..................................... 248/918 |
| 5,816,554 | 10/1998 | McCracken ........................ 248/346.01 |

*Primary Examiner*—Ramon O. Ramirez
*Assistant Examiner*—Walter Landry
*Attorney, Agent, or Firm*—Robert E. Bushnell, Esq.

[57]                ABSTRACT

A stand for a display monitor that allows smoother adjustment of the screen angle may be constructed using a stand display interface that is fixed to the bottom of a monitor body or integrally formed with a stand unit. The slip surfaces between the convex ball portion of the stand display interface and the stand unit are reduced thereby reducing the amount of dust created and smoothing the adjustment of monitors.

24 Claims, 9 Drawing Sheets

MONITOR STAND WITH SMOOTH TILTING AND ROTATING MOVEMENTS

CLAIM OF PRIORITY

This application makes reference to, incorporates the same herein, and claims all rights accruing thereto under 35 U.S.C. § 119 through my patent application entitled Display Monitor Stand With Smooth Control of Display Angle earlier filed in the Korean Industrial Property Office on the 10th day of January 1997 and there duly assigned Ser. No. 1997/408.

BACKGROUND OF THE INVENTION

1. Field of the Invention

The present invention relates to a display device stand and, more specifically, to a display device stand that allows the smoother adjustment of a monitor.

2. Background Art

With the increasing amounts of information that are managed and displayed using computers, the development of higher quality monitors has been an area of extensive research. This research has led to improvements in the miniaturization of internal components, in the reduction of monitor thickness, and in the quality of picture displayable by a monitor.

A cathode ray tube (CRT) monitor may be constructed using a CRT display unit, a stand unit, and a stand-display interface. The CRT display unit's front and rear housings are assembled into a single housing containing both a CRT and a printed circuit board (PCB). The stand unit supports the display unit on a support surface and includes a plurality of connectors for power and signal cables.

The swiveling devices used for CRT monitor stands may be constructed with a recess that is positioned on the top center of the stand unit and rotatably receives the bottom surface of a bushing integrated into the stand-display interface. A boss projecting from the bottom center of the recess having two diametrically-opposite wing projections may be used to engage the display unit. Two protrusions used to stop the rotation of the monitor can be positioned on the bottom surface of the recess diametrically opposed to each other. Located in the center of the bottom surface of the stand-display interface is a coupling hole that engages the winged boss. The diametrically opposite wing projections hold the stand-display interface, and thus the monitor, onto the stand.

Some monitor stands that are representative of the art are shown, for example, in U.S. Pat. No. 5,588,625 to Beak entitled Monitor Stand Assembly, U.S. Pat. No. 5,632,463, to Sung entitled Monitor Stand Assembly, U.S. Pat. No. 4,645,153 to Granzow entitled Tilt and Swivel Support, U.S. Pat. No. 4,483,503 to Gahan entitled Swivel Mountings, and U.S. Pat. No. 4,589,713 entitled Video Display Support Joint. Due to increasing user and application requirements, some CRT monitors use additional PCBs to increase the performance capabilities of the monitor. While additional PCBs have increased performance, they have also increased the weight of contemporary high performance CRT monitors.

With the adjusting of the angle between the monitor and the stand unit of the heavier CRT monitors, frictional forces between the concave socket in the stand unit and the convex ball portion of the stand display interface are generated due to the intense concentration of the monitor's weight onto the contact areas. Because the convex ball portion of the stand display interface is in contact with the overall area of the concave socket of the stand unit, the total force generated by friction can prevent the smooth movement of the stand when the monitor is adjusted.

One technique for overcoming the problem of jittery monitor motion is to coat the concave socket in the stand unit with a Freon based lubricant. Freon based lubricant, however, is very hard to separately collect and does not decompose, thus tending to contaminate the soil or earth with which it comes into contact.

The stand unit may be manufactured using injection molded plastic. While this method is very economical, the type of material used with injection molding techniques tends to produce dust (white powder) when the stand display interface moves against the stand unit due to the large frictional area and frictional force between the convex ball portion of the stand display interface and the concave socket in the stand unit. This problem is especially significant when the monitor stand is constructed out of PC/ABS resin because of the increased amount of dust that is generated by the frictional interaction of the stand components when they are made out of this material. When a user tilts or swivels the monitor, white powder falls on the stand unit, thus decreasing the product's reliability and providing an irritation to the user. Additionally, stand lubricant is designed to be sprayed onto the stand display interface manually and depending upon the amount of spray, the stand display interface can be either too tight or too loosely fitted into the concave socket in the stand unit. If the fit between the stand display unit and the stand unit is too loose due to excessive coating of the lubricant, the monitor's eccentrically positioned center of gravity will cause the CRT to roll backwards or forwards. This will cause the monitor to either face upward or downward when it is in an equilibrium position. Thus, the smoothness of the tilt and swivel of the monitor is unscientifically determined by the amount of lubricant added and the condition of the worker on the day that the lubricant is manually applied to the monitor stand. Furthermore, using injection molded plastic stands makes it difficult to create smooth surfaces, depending upon their injection status or change of temperature, for both the concave socket in the stand unit and the convex ball portion of the stand display interface. The roughened contact surface further prevents smooth adjustment of the monitor when adjusting the angle of screen display, thus causing the CRT monitor to clatter or shake.

I believe that it may be possible to improve on the design of contemporary monitor stands. The typical monitor stands for heavy display devices are hard to build economically without compromising reliability and while reducing the amount of dust generated along slip surfaces in the monitor stand. A monitor that is economical to build, has improved weight distribution, smoother adjustability of the display device relative to the stand, that reduces the amount of dust generated due to frictional contact along the slip surfaces, that reduces the area of slip areas between slidably contacting monitor stand components, and avoids the reliability drawbacks of manually applied lubricant would increase the competitiveness of the corresponding monitors in the market place and improve the quality of product that is manufactured.

SUMMARY OF THE INVENTION

Accordingly, it is an object of the present invention to provide an improved monitor stand that more effectively distributes the weight of the monitor.

It is a another object to provide a monitor stand that is smoothly adjustable during either a tilting or swiveling motion.

It is still another object to provide a monitor stand that reduces the amount of dust generated due to frictional forces exerted between the monitor stand components.

It is yet another object to provide a monitor stand that reduces the area of slip surfaces between slidably contacting monitor stand components.

It is still yet another object to provide a monitor stand that has increased reliability.

It is a further object to provide a monitor stand that avoids the problems associated with the manual application of lubricant.

It is a further object still to provide a monitor stand that increase the market competitiveness of associated display devices.

To accomplish these and other objects a stand is provided that has a stand display interface fixed to the bottom of a monitor's body. The stand display interface is then fastened to the stand unit where it can be adjusted by either tilting or swiveling the monitor body. The contact surface between the stand unit and the convex ball portion of the stand display interface is reduced through the use of protruding ribs that reduce the area of the slip surface between the two components. This reduces the amount of dust produced by the rotation of the ball portion of the stand display interface in the stand unit. Additionally, materials having a lower coefficient of friction can be used to form the rib protrusions while still using the economical injection molded plastic method. Thus, even the cost of smoother materials is minimized by reducing the necessary volume of the additional materials.

The protruding ribs can be oriented circumferentially around the edge of the concave socket or the protruding ribs can be radially aligned around the concave socket. When the protruding ribs are radially aligned rotational motion tends to be arrested, thus reducing clattering or shaking.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
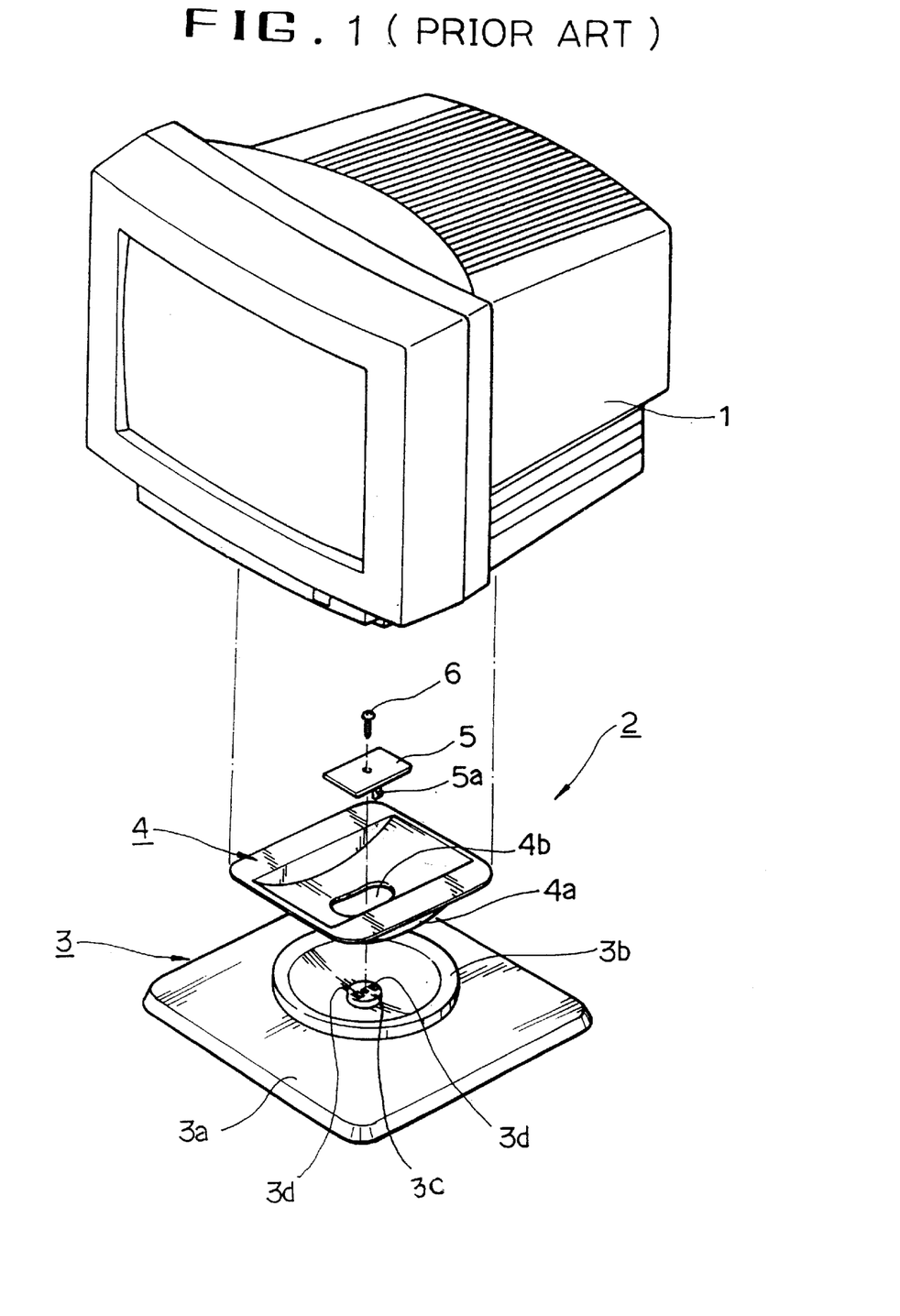
FIG. 1 is an exploded perspective view of a monitor stand as constructed according to the prior art.
Figure 2:
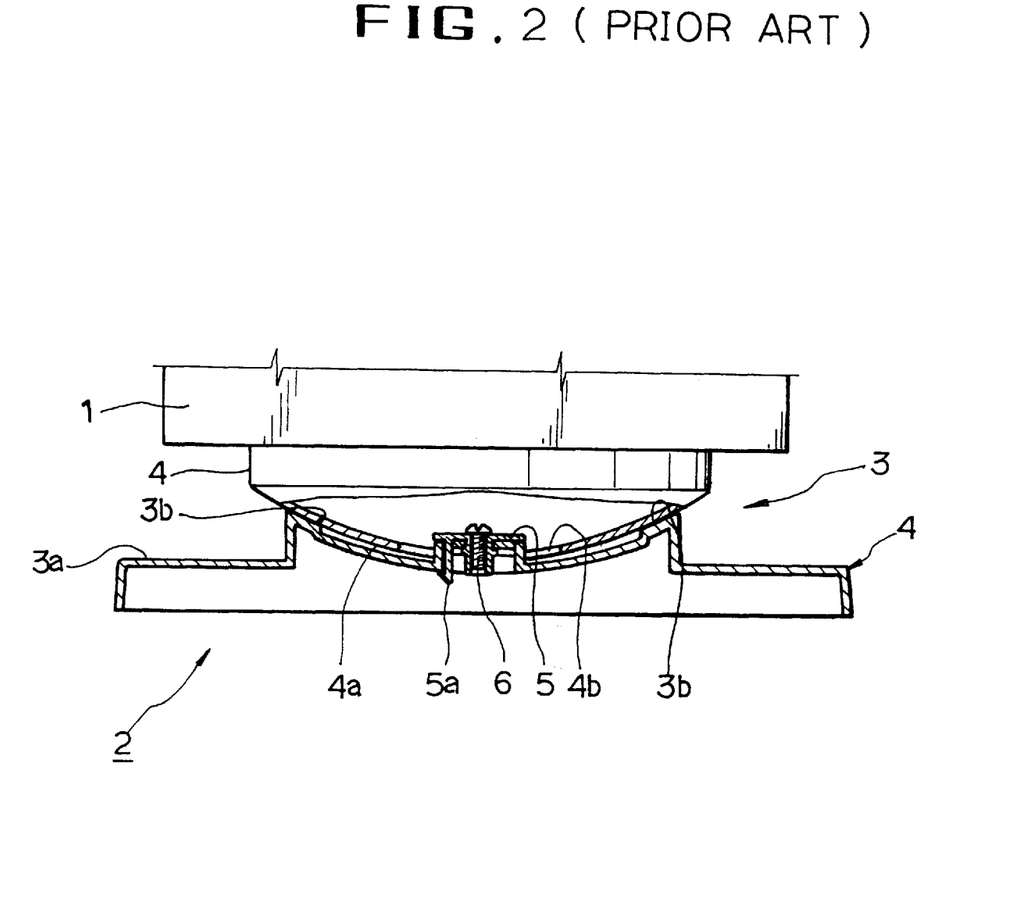
FIG. 2 is an assembly section of the stand of FIG. 1.

Turning now to the drawings, FIGS. 1 and 2 illustrate a monitor stand as constructed according to the prior art. Stand 2 is designed so that stand display interface 4 is a separate component and is not built into monitor body 1. To stably support heavy monitor body 1, stand 2 is constructed using a wide bottom stand unit 3. The stand unit has concave socket 3b that is formed to slope towards the center of the socket.

Convex ball portion 4a of stand display interface 4 is coupled and fixed to the bottom of monitor body 1 and also engaged with concave socket 3b. When the stand display interface is engaged with the stand unit convex ball portion 4a of the stand snap 5a of fixing device 5 is inserted into fastening hole 3d of boss 3c via elongated hole 4b. Then, fixing device 5 is fastened in place by fastener 6. Thus, stand display interface 4 is movable while remaining secured to stand unit 2. The force generated by the weight of monitor body 1 is applied to stand unit 3 via stand display interface 4. The force loaded onto stand display interface 4 is concentrated at convex ball portion 4a and transferred to concave socket 3b of stand unit 3.

Figure 3:
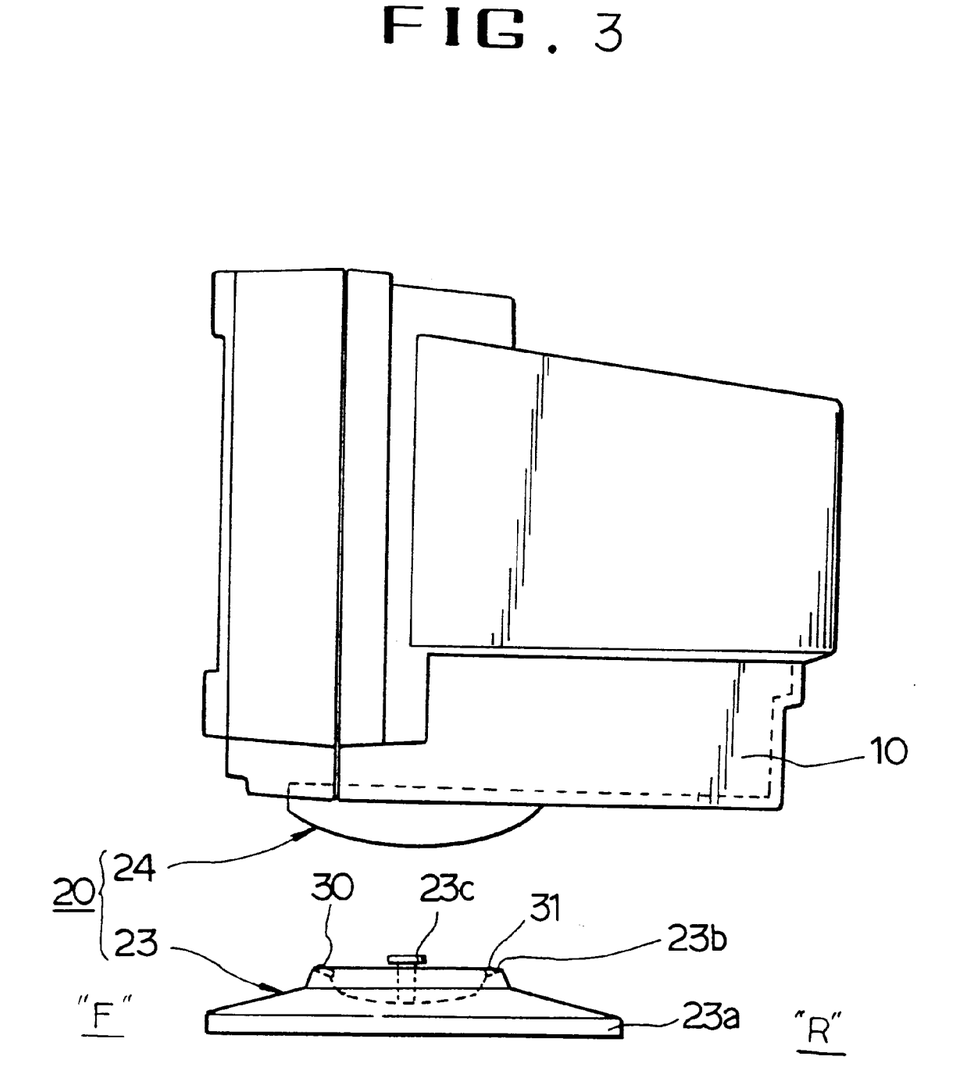
FIG. 3 is an exploded perspective view of a monitor and stand as constructed according to a first embodiment of the present invention.

FIG. 3 shows monitor stand 20 constructed according to the principles of the present invention with stand display interface 24 integrally formed as part of monitor body 10. Stand display interface is then interfaced with stand unit 23 to support heavy monitor body 10. Stand unit 23 has wide bottom 23a and a concave socket 23b formed in the top center of the stand.

Figure 4:
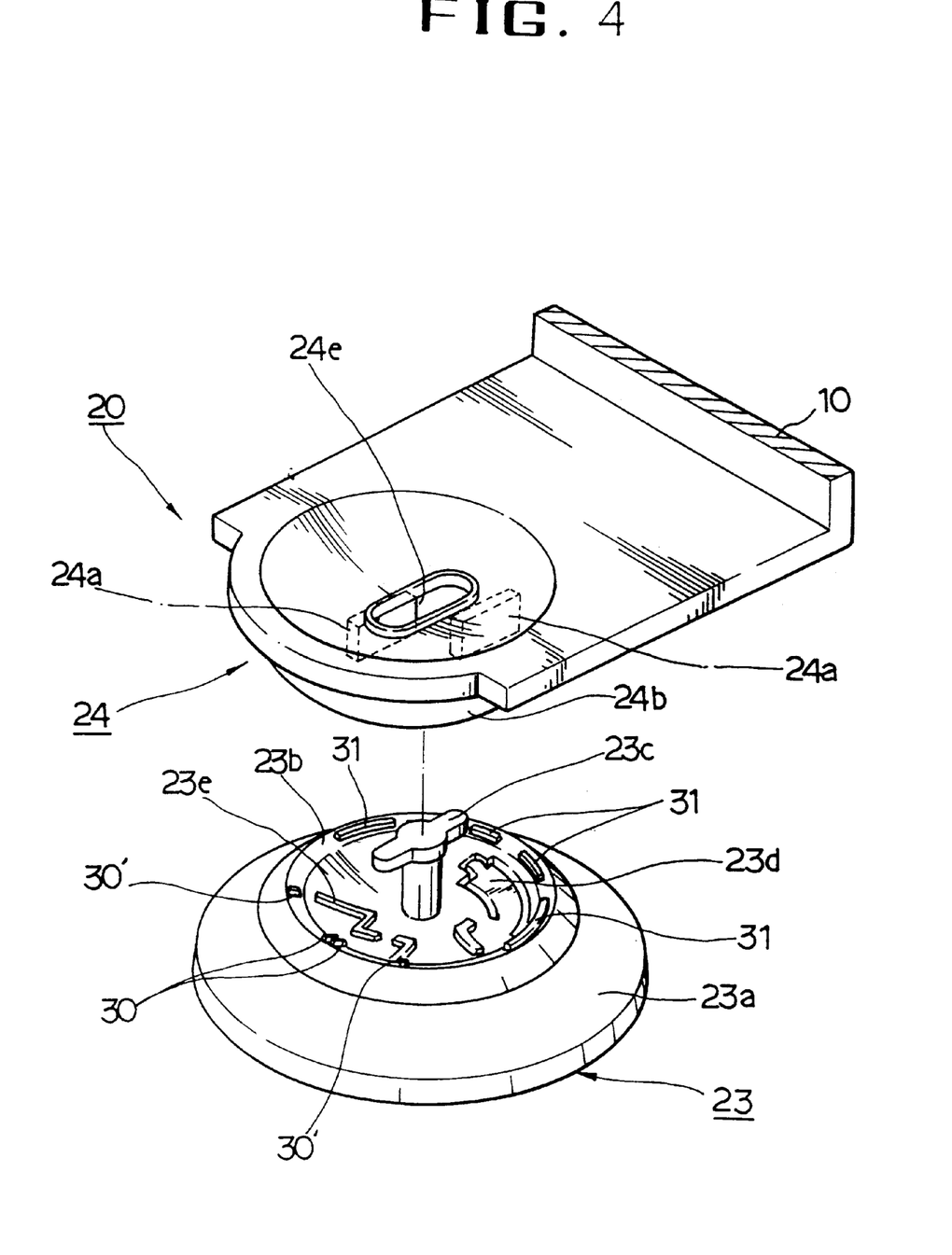
FIG. 4 is an exploded perspective view of the monitor stand of FIG. 3.

FIG. 4 shows a cross section of the display device and stand shown in FIG. 3. Convex portion 24b of stand display interface 24 is integrally formed with the bottom of monitor body 10 and is movably coupled with concave socket 23b. Here, as the stand display interface and associated monitor are rotated counterclockwise after winged boss 23c has been inserted through elongated hole 24e, catch rib 24a is assembled to rotate between detachment preventing rib 23d and angle control rib 23e. This causes stand display interface 24 to be movable while not detaching from stand unit 23.

Figure 5:
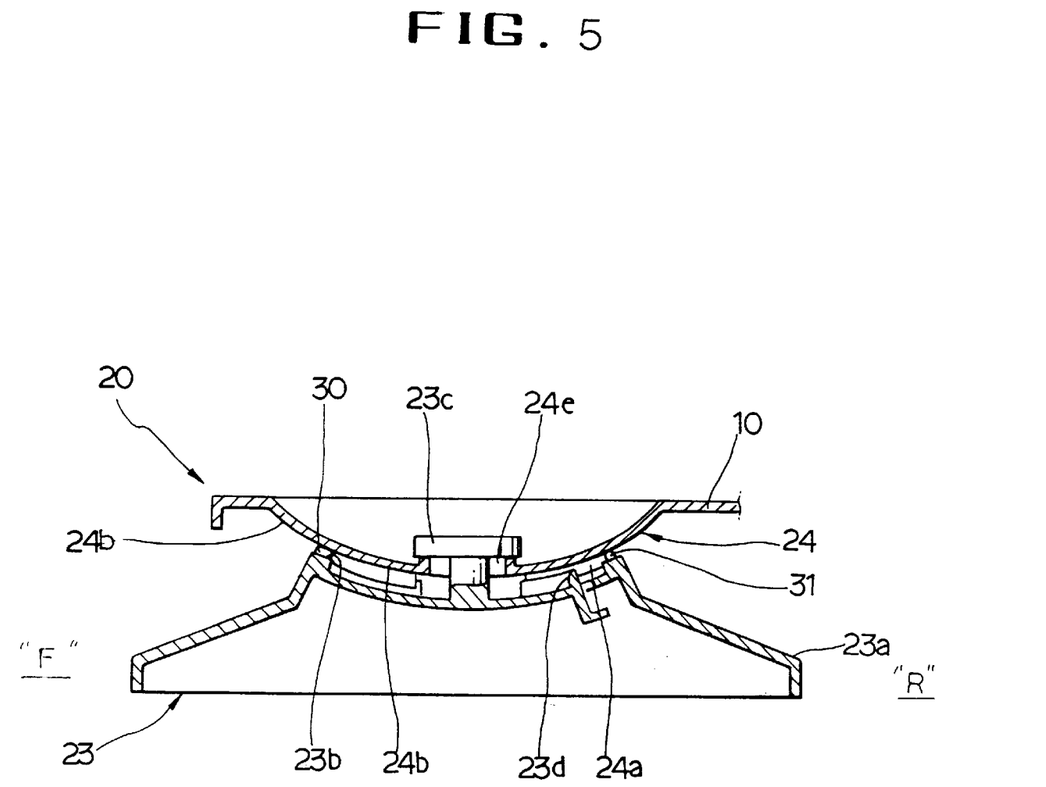
FIG. 5 is an assembly section of the monitor stand of FIG. 3.

As shown in FIG. 5, stand unit 23 has a front direction F and a rear direction R. The front direction indicates the direction in which the monitor screen faces when monitor body 10 is attached to stand unit 23. FIG. 4 shows concave socket 23b and a pair of tilt-purposed protrusions 30 that are located at a predetermined interval. Tilt-purposed protrusions 30' are positioned on both sides of pair of tilt-purposed protrusions 30. The angle between tilt-purposed protrusions 30' is preferably the range of angle of swivel in which monitor body 10 moves left and right. Tilt-purposed protrusions 30 and 30' may be integrally made with stand unit 20 using injection-molded of plastic, and they are formed to be lengthwise in the tilt direction where monitor body 10 moves up and down. Concave socket 23b also has a plurality of swivel-purposed protrusions that are positioned opposite to tilt-purposed protrusions 30 and 30'. Swivel-purposed protrusions 31 may be equally divided into four and are arranged lengthwise in the direction of rotation of stand display interface 24.

The narrow tops of tilt-purposed protrusions 30 and 30' and swivel-purposed protrusions 31 become slip surfaces so that when stand display interface 24 is movably fastened to stand unit 23, the convex portion 24b comes into contact with the tops of tilt-purposed protrusions 30 and 30' and the tops of swivel-purposed protrusions 31. In this embodiment, the orientation of the new slip surfaces causes the weight of monitor body 10 to be uniformly distributed to stand unit 23 via stand display interface 24.

More specifically, monitor body 10 can be made so that the front is usually heavier than the rear and so that both sides are lighter than the front and back. For this reason, the weight of monitor body 10 acts in either of the front and rear directions of stand unit 23. In addition, tilt-purposed protrusions 30 and 30' and swivel-purposed protrusions 31 that are placed in the front and rear sides of the concave socket to sustain the monitor body so that its weight is evenly distributed along bottom 23a of stand unit 23.

Figure 10:
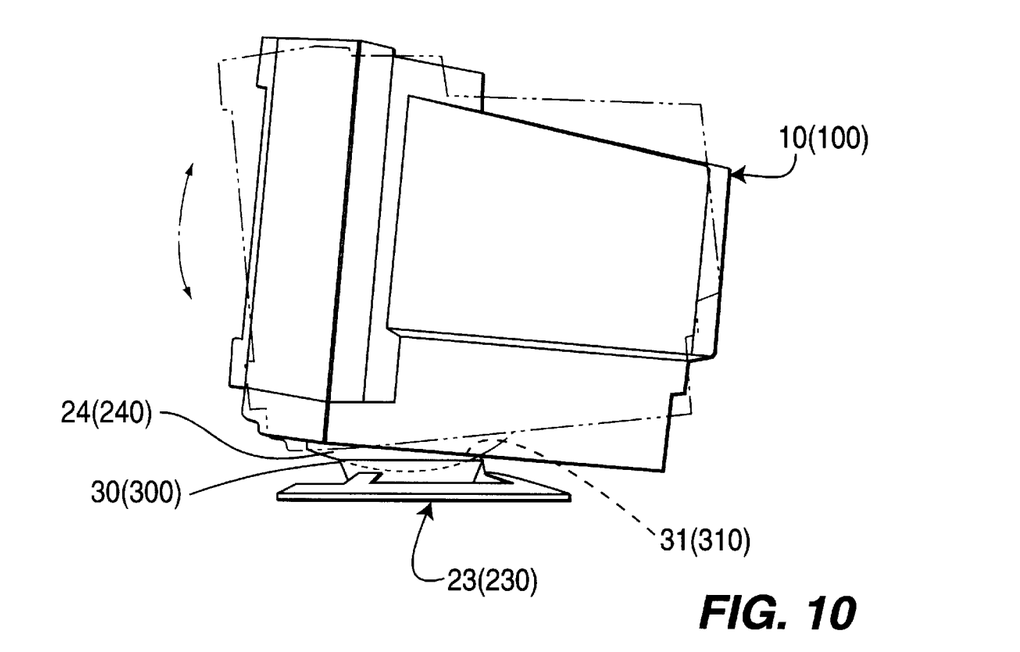
FIG. 10 is a schematic side view depicting the adjustment of the angle between the display device and the monitor stand.

When the angle of monitor body 10 is adjusted up and down, as shown in FIG. 10, convex ball portion 24b of the stand display interface slides smoothly because the tilt-purposed protrusions 30 and 30' are oriented lengthwise in the direction of tilt. Also increasing the smoothness of tilting the monitor are swivel-purposed protrusions 31 located along the rear side of the concave socket because the slip surfaces in the rear direction also smoothly slide because their area of the slip surfaces has been reduced. The reduced slip surfaces also reduce the amount of dust generated by the contacting of monitor stand components when adjusting the display device. Furthermore, the tilt-purposed protrusions and the swivel purposed protrusions can be made out of smoother materials and then attached to the monitor stand. This would allow for increased smoothness of monitor adjustment while still using the economical injection molded plastic technique.

The smoothness of swivel-purposed protrusions 31 is designed to reduce the external force that must be applied to monitor body 10 by a user to tilt the display device. When the external force is terminated after the display device is correctly oriented, the tilt operation direction and the swivel-purposed protrusions 31 are intersected so that the stand display interface including the monitor body cannot be moved back and forth.

Figure 11:
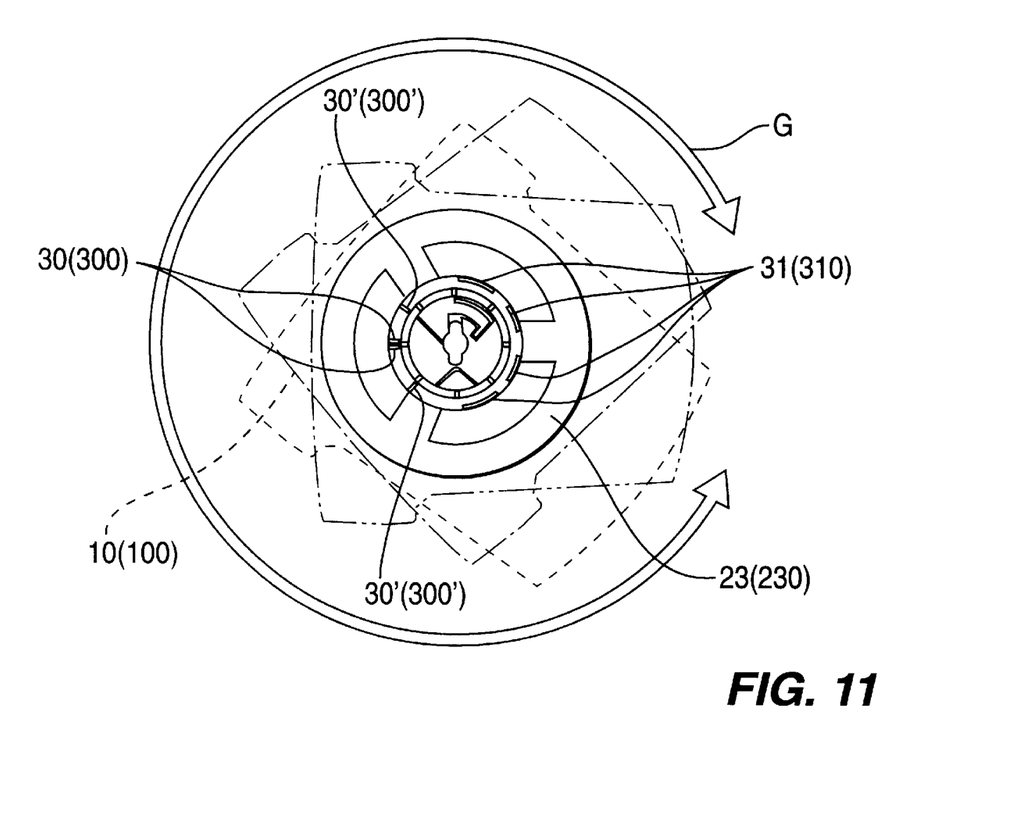
FIG. 11 is a plan view depicting the rotational adjustment of the display device.

As shown in FIG. 11, the swivel-purposed protrusions allow the monitor body to by smoothly rotated left and right. The swivel-purposed protrusions are oriented lengthwise in the direction of rotation, and because the tilt-purposed protrusions 30 and 30' have a slip surface area smaller than that of the prior art. When the external force required for swivel operation is terminated, stand display interface 24, including monitor body 10, cannot be naturally rotated or moved due to its own weight because tilt-purposed protrusions 30 and 30' are oriented perpendicularly to the direction of rotation.

In the prior art, when the tilt and swivel operations are completed, the motion arresting force exerted by the tilt-purposed protrusions and swivel-purposed protrusions, that may be compressed by the weight of the monitor body, is caused by the friction between them and convex ball portion 24b of stand display interface 24. The friction, however, can be overcome by an external force that is applied by the user to change the angle of display, thus allowing the smooth adjustment of the monitor's screen angle. During the tilt and swivel operations used to adjust the angle of the screen, the convex ball portion of the stand display interface and the top surfaces of the tilt-purposed protrusions and swivel-purposed protrusions slip against each other.

A second embodiment of the present invention is shown in FIGS. 6 through 9. Stand unit 230 has wide bottom 230a to stably sustain heavy monitor body 101. Concave socket 230b is located in the top center of stand unit 230.

Figure 6:
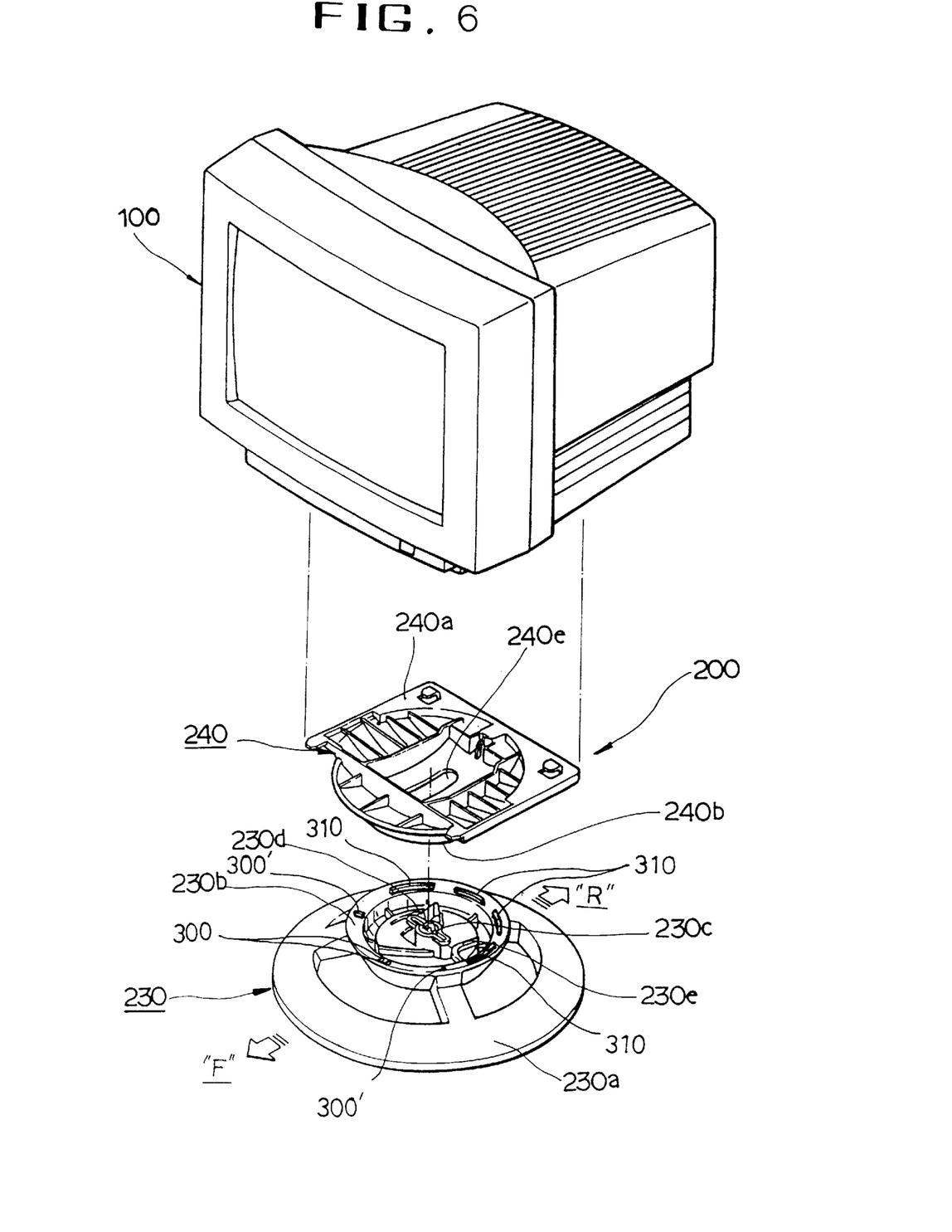
FIG. 6 is an exploded perspective view of a monitor stand as constructed according to a second embodiment of the present invention.
Figure 7:
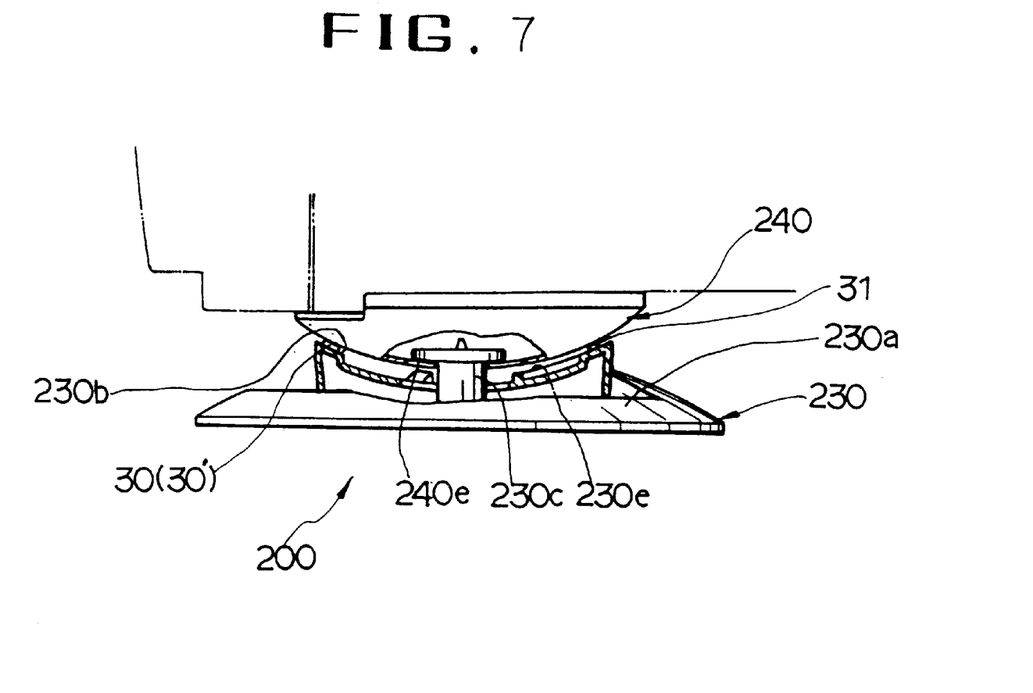
FIG. 7 is an assembly section of the monitor stand of FIG. 6.

Concave portion 240b of stand display interface 240 has latching portion 240a that securely fastens to the bottom of monitor body 100 and is then movably coupled to concave socket 230b. Here, a winged boss 230c passes through elongated hole 240e of stand display interface 240.

Guide rib 240c of stand display interface 240 passes through detachment preventing rib 230d while compressing it, making the stand display interface rotatable between angle control rib 230e and detachment preventing rib. Thus, stand display interface 240 can move without being detached. Stand 200 operates in the same fashion as the first embodiment. On the front side of concave socket 230b of stand unit 230, pair of tilt-purposed protrusions 300 and second pair of tilt-purposed protrusions 300' are symmetrically placed. Tilt-purposed protrusions 300 and 300' are positioned lengthwise in the direction of tilt.

Figure 8A:
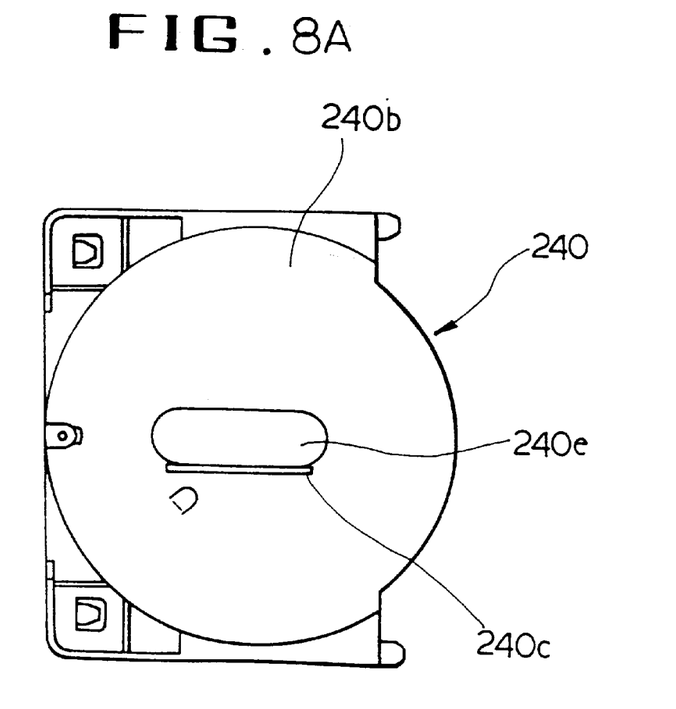
FIG. 8A is a bottom view of the stand display interface for the monitor stand of FIG. 6.
Figure 8B:
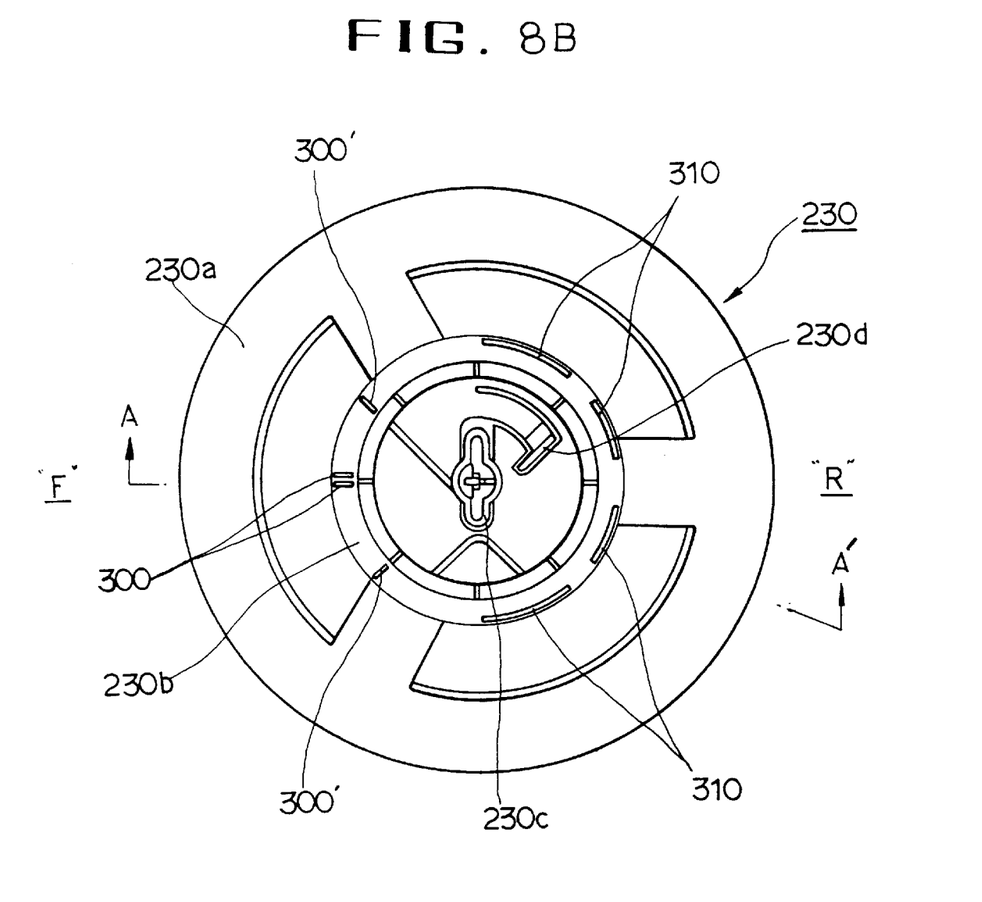
FIG. 8B is a plan view of the stand unit of the monitor stand of FIG. 6.
Figure 9:
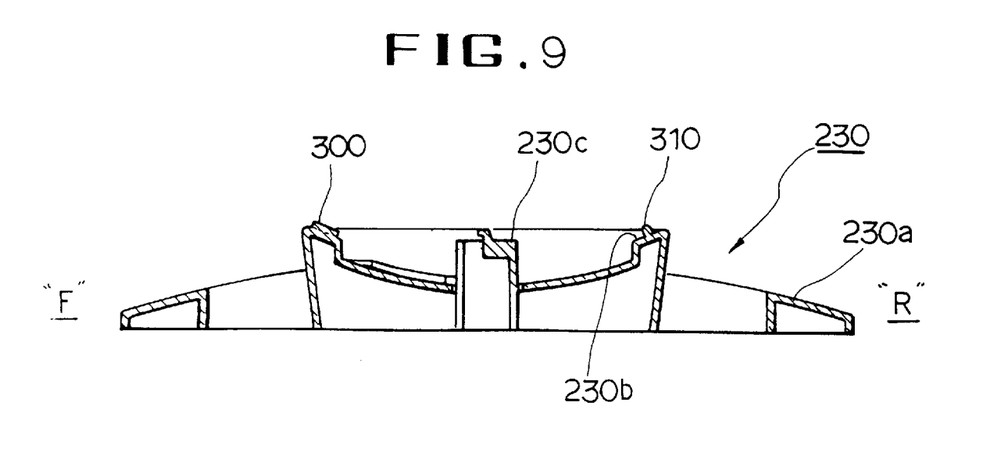
FIG. 9 is an enlarged section of the line A-A' shown in FIG. 8B.

A plurality of swivel-purposed protrusions 310 are provided lengthwise along the direction of monitor rotation. Concave portion 240b of stand display interface 240 slides against the tilt-purposed protrusions 300 and 300' and swivel-purposed protrusions 310, while being adjusted by a user. Even with the smaller area slip surface of stand unit 230, the stand functions as a stable support by dispersing the weight of monitor body 100.

The embodiments can be modified to also have a microphone or speaker jack built into the stand. The design of the embodiments allows for the smooth adjustment of a display device mounted on a monitor stand built according to the principles of the present invention while still allowing the angle of display to be easily adjusted. By reducing the area of the slip surfaces the amount of dust created by the monitor stand's components is reduced and the smoothness of adjustment is increased. The tilt and swivel protrusions can be formed as part of the monitor stand using the economical injection molded plastic technique or the protrusions can be made of a separate material and then attached to the monitor stand. This allows for a lower coefficient of friction material to be used while still allowing the monitor stand to be produced economically.

In addition, the reduced slip surfaces no longer require lubrication. This avoids the lack of reliability inherent with needing to manually apply lubricant. By eliminating the lubricant application step, the cost of producing monitors is reduced.

The present invention can be applied to all kinds of stands where a slip surface is used between a stand display interface and the stand unit. Although two preferred embodiments of the present invention have been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A monitor, comprising:
    a stand having a base in contact with a supporting surface supporting said stand;
    an interface device having a convex ball portion on a side contacting said stand to allow both tilting and rotating motions, said convex ball portion having a perforation for securing said interface device to said stand;
    a housing attached to said interface device and containing a display device;

a concave socket positioned in said stand on a side opposite to said base and bounded by a rim that extends peripherally around said concave socket to reduce the area of contact between said interface device and said stand;

a plurality of spaced-apart radially extending protrusions arrayed in arcuately spaced-apart positions around an arc of said rim;

a boss attached to a center of said concave socket in said stand, having a tubular shape, and being insertable into said perforation in said interface device; and said boss in said concave socket insertable through said perforation in said convex ball portion of said interface device causing an outer surface of said convex ball to contact said ribbed protrusions located along said concave socket and allowing said display device to be smoothly adjusted.

2. The monitor of claim 1, further comprised of a second plurality of spaced-apart, arcuately extending protrusions arrayed in arcuately spaced-apart positions around a second and different arc of said rim diametrically opposite from said first arc.

3. The monitor of claim 2, further comprised of said perforation retentively receiving said boss while said interface device accommodates said tilting and rotating motions and said ball portion simultaneously contacts some of said plurality of arcuately extending protrusions and said some of said first plurality of arcuately extending protrusions maintain said ball portion spaced-apart from said rim.

4. The monitor of claim 2, further comprised of said first plurality of radially extending protrusions and said second plurality of arcuately extending protrusions being made of the same material as said stand.

5. The monitor of claim 2, further comprised of said plurality of radially extending protrusions and said second plurality of arcuately extending protrusions being made of a material different from said stand.

6. The monitor of claim 1, further comprising:

said socket being spaced-apart from said base; and said perforation retentively receiving said boss while said interface device accommodates said tilting and rotating motions and said ball portion simultaneously contacts some of said plurality of radially extending protrusions, and said some of said plurality of radially extending protrusions maintain said ball portion spaced-apart from said rim.

7. The monitor of claim 1, further comprised of said interface device being rotatable through at least 320 degrees relative to said stand.

8. The monitor of claim 1, further comprised by said interface device being integrally formed with said housing.

9. A stand for a video monitor, comprising:

an interface fixed to the bottom of a body of said video monitor;

a stand unit swively and tiltably fastened to said display interface; and a plurality of arcuately spaced-apart ribbed extending protrusions located between said interface and said stand unit, on a peripheral rim of said stand unit defining a region of contact between said interface and said stand unit and contacting said interface when said stand unit is fastened to said interface while allowing said interface to be tilted and swivelled relative to said stand unit;

said plurality of ribbed protrusions including a plurality of spaced-apart, radially extending protrusions arrayed in arcuately spaced-apart positions around an first arc of said rim.

10. The stand of claim 9 further comprised of a second plurality of spaced-apart, arcuately extending protrusions arrayed in arcuately spaced-apart positions around a second and different arc of said rim diametrically opposite from said first arc.

11. The stand of claim 9 further comprised of said arc of said rim defining a front direction of said stand unit.

12. The stand as claimed in claim 10 further comprised of said second and different arc of said rim defining a rear direction of said stand unit.

13. The stand of claim 9, further comprised of:

a convex ball projecting from said interface;

a concave socket bound by said rim, formed in said stand unit and retentively receiving said ball; and said plurality of ribbed protrusions comprising a second plurality of spaced-apart, arcuately extending protrusions positioned between said rim and said ball, and arrayed in arcuately spaced-apart positions around a second and different arc of said rim diametrically opposite from said first arc.

14. The stand of claim 9, with said plurality of ribbed protrusions comprising said plurality of spaced-apart, radially extending protrusions positioned between said rim and said convex ball.

15. A monitor, comprising:

a stand having a base in contact with a supporting surface, an interface device having a convex ball portion on a side contacting said stand to allow both tilting and rotating motions and being integrally formed with a housing containing a display device, said convex ball portion having a perforation for securing said interface device to said stand;

a concave socket positioned in said stand and being spaced-apart from said base and bounded by a rim that extends peripherally around said socket;

a plurality of spaced-apart, arcuately extending protrusions arrayed in arcuately spaced-apart arcuate segments around an arc of said rim;

a boss attached to a center of said concave socket in said stand and insertable into said perforation in said convex ball portion of said interface device; and said boss in said concave socket insertable through said perforation in said convex ball portion of said interface device causing an outer surface of said convex ball to contact said extending protrusions located along said concave socket and allowing said display device to be smoothly adjusted.

16. The monitor of claim 15, further comprised of:

said boss having at least one projection located at a distal end to prevent said interface device from detaching from said stand;

a second plurality of spaced-apart, radially extending protrusions arrayed in arcuately spaced-apart positions around a second and different arc of said rim diametrically opposite from said first arc; and said perforation retentively receiving said boss while said interface device accommodates said tilting and rotating motions and said ball portion simultaneously contacts some of said first plurality of arcuately extending protrusions and some of said second plurality of radially extending protrusions, and said some of said first plurality of arcuately extending protrusions and said some of said second plurality of radially extending protrusions maintain said ball portion spaced-apart from said rim.

17. The monitor of claim 15 further comprising:

said boss having a hollow tubular shape and said projection being located at a distal end of said boss and extended from said boss in a direction perpendicular to said base; and said perforation retentively receiving said boss while said interface device accommodates said tilting and rotating motions and said ball portion simultaneously contacts some of said first plurality of arcuately extending protrusions and said some of said first plurality of arcuately extending protrusions maintain said ball portion spaced-apart from said rim.

18. The monitor of claim 15 further comprising said second plurality of spaced-apart, radially extending protrusions arrayed in arcuately spaced-apart positions around an arc of said rim; and said perforation retentively receiving said boss while said interface device accommodates said tilting and rotating motions and said ball portion simultaneously contacts some of said second plurality of radially extending protrusions, and said some of said second plurality of radially extending protrusions maintain said ball portion spaced-apart from said rim.

19. The monitor of claim 15 further comprised of:

said first plurality of spaced-apart, arcuately extending protrusions positioned between said rim and said ball portion; and said second plurality of spaced-apart, radially extending protrusions positioned between said rim and said ball portions, said second plurality of radially extending protrusions being arrayed in arcuately spaced-apart positions around a second and different arc of said rim diametrically opposite from said first arc.

20. The monitor of claim 15 further comprising:

said rim defining a peripheral boundary of said socket; and said perforation retentively receiving said boss while said interface device accommodates said tilting and rotating motions and said plurality of extending protrusions maintain said ball portion spaced-apart from said rim.

21. The monitor of claim 15 further comprised of said first and second plurality of extending protrusions being arcuately spaced-apart in an arc of said rim and positioned between said rim and said ball portion while said perforation retentively receives said boss and said interface device accommodates said tilting and rotating motions.

22. A monitor, comprising:

a stand having a base engaging any lower surface that supports said stand, a concave socket spaced-apart from said base and bounded by a rim that extends peripherally around said socket, and a retainer extending radially from within said socket;

a first plurality of spaced-apart, arcuately extending protrusions arrayed in arcuately spaced-apart arcuate segments around a first arc of said rim;

a second plurality of spaced-apart, radially extending protrusions arrayed in arcuately spaced-apart positions around a second and different arc of said rim diametrically opposite from said first arc; and an interface exhibiting a convex ball perforated by a slot positioned within said socket to retentively receive, rotate around, and tilt about said retainer while said ball simultaneously contacts some of said first plurality of arcuately extending protrusions and some of said second plurality of radially extending protrusions, and said some of said first plurality of arcuately extending protrusions and said some of said second plurality of radially extending protrusions maintain said ball spaced-apart from said rim.

23. The monitor of claim 22, further comprising said first plurality of arcuately extending protrusions and said second plurality of radially extending protrusions being made of the same material as said stand.

24. The monitor of claim 22, further comprising said first plurality of arcuately extending protrusions and said second plurality of radially extending protrusions being made of a material different from said stand.

* * * * *